United States Patent [19]
Zhang

[11] Patent Number: 5,649,716
[45] Date of Patent: Jul. 22, 1997

[54] AUTO-ELECTRIC FLASH WHEELS OF ROLLING SKATE

[76] Inventor: Shin-Chiu Zhang, 58, Ma Yuan West St., Taichung, Taiwan

[21] Appl. No.: 576,993

[22] Filed: Sep. 27, 1995

[51] Int. Cl.[6] .................................................. A63C 17/04
[52] U.S. Cl. ........................... 280/11.19; 280/11.22; 362/78; 362/193; 301/5.3
[58] Field of Search ..................... 280/11.19, 807, 280/11.22, 11.23, 11.27, 87.042; 301/5.3, 5.7; 362/78, 103, 192, 193, 800

[56] References Cited

U.S. PATENT DOCUMENTS

| | | | |
|---|---|---|---|
| 4,298,910 | 11/1981 | Price | 280/11.19 |
| 4,648,610 | 3/1987 | Hegyi | 280/11.19 |
| 5,294,188 | 3/1994 | Vancil, Jr. | 280/11.19 |
| 5,390,941 | 2/1995 | Pozzohon et al. | 280/11.19 |
| 5,536,026 | 7/1996 | Pozzohon et al. | 280/11.19 |

*Primary Examiner*—Richard M. Camby

[57] ABSTRACT

An automatic power generating flash wheel assembly comprises at least a fly wheel and at least a coil unit. The fly wheel is enclosed by a transparent outer wheel. At least an inserted groove is formed in the inner periphery of the fly wheel to receive a set of the coil unit. Each of the coil unit has a couple of electrodes at one side and a light-emitting device at the opposite side. The electrodes are disposed toward a pivot. An annular magnet has a recess formed in the inner periphery of the magnet. A protrusion rib on the pivot is inserted through the recess. The magnet touches the electrodes slightly. The magnet is disposed between the first and second annular pivot sockets. The pivot passes through the first pivot socket, the magnet and the second pivot socket. The first pivot socket, the magnet and the second pivot socket are disposed in the fly wheel.

7 Claims, 4 Drawing Sheets

5,649,716

AUTO-ELECTRIC FLASH WHEELS OF ROLLING SKATE

BACKGROUND OF THE INVENTION

The invention relates to a power generating roller skate. More particularly, the invention relates to auto-electric flash wheels for automatic power generating roller skate.

Most light-emitting roller skates have exposed circuits which has awkward and ugly appearances. The light emitting diode (LED) of the roller skate should be excited by a battery. After a long period of usage, the battery should be replaced. The roller skate should be disassembled in order to take out the battery in the roller skate.

SUMMARY OF THE INVENTION

An object of the invention is to provide fly wheels for automatic power generating roller skate in order to provide automatic generating electric power for the light-emitting device.

Accordingly, an automatic power generating fly wheel assembly comprises at least a fly wheel and at least a coil unit. The fly wheel is enclosed by a transparent outer wheel. At least an inserted groove is formed in the inner periphery of the fly wheel to receive a set of the coil unit. Each of the coil unit has a couple of electrodes at one side and a light-emitting device at the opposite side. The electrodes are disposed toward a pivot. An annular magnet has a recess formed in the inner periphery of the magnet. A protrusion rib on the pivot is inserted through the recess. The magnet touches the electrodes slightly. The magnet is disposed between the first and second annular pivot sockets. The pivot passes through the first pivot socket, the magnet and the second pivot socket. The first pivot socket, the magnet and the second pivot socket are disposed in the fly wheel.

DETAILED DESCRIPTION OF THE INVENTION

Figure 1:
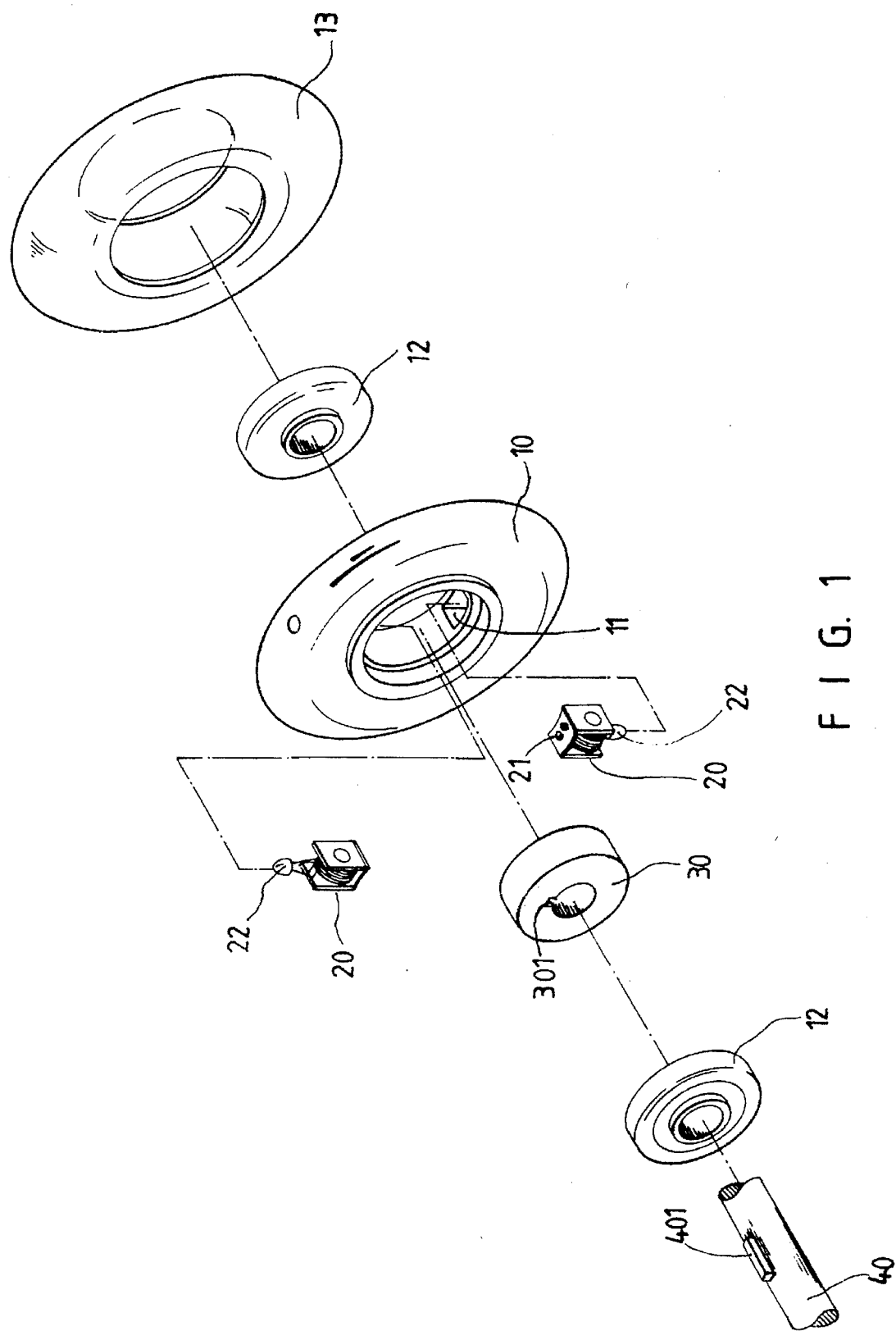
FIG. 1 is a perspective exploded view of a preferred embodiment in accordance with the invention.
Figure 2:
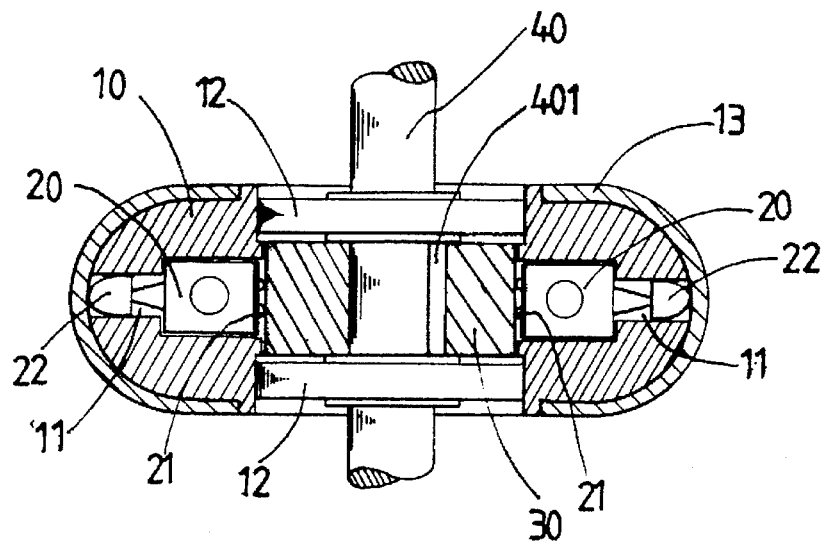
FIG. 2 is a cross-sectional view of a preferred embodiment in accordance with the invention.
Figure 3:
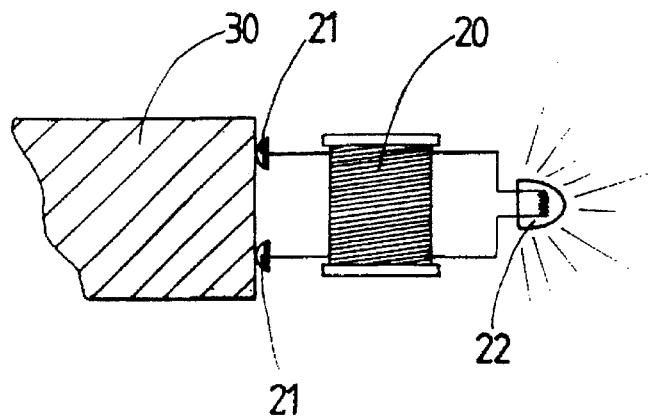
FIG. 3 is a schematic view showing the coil unit.
Figure 4:
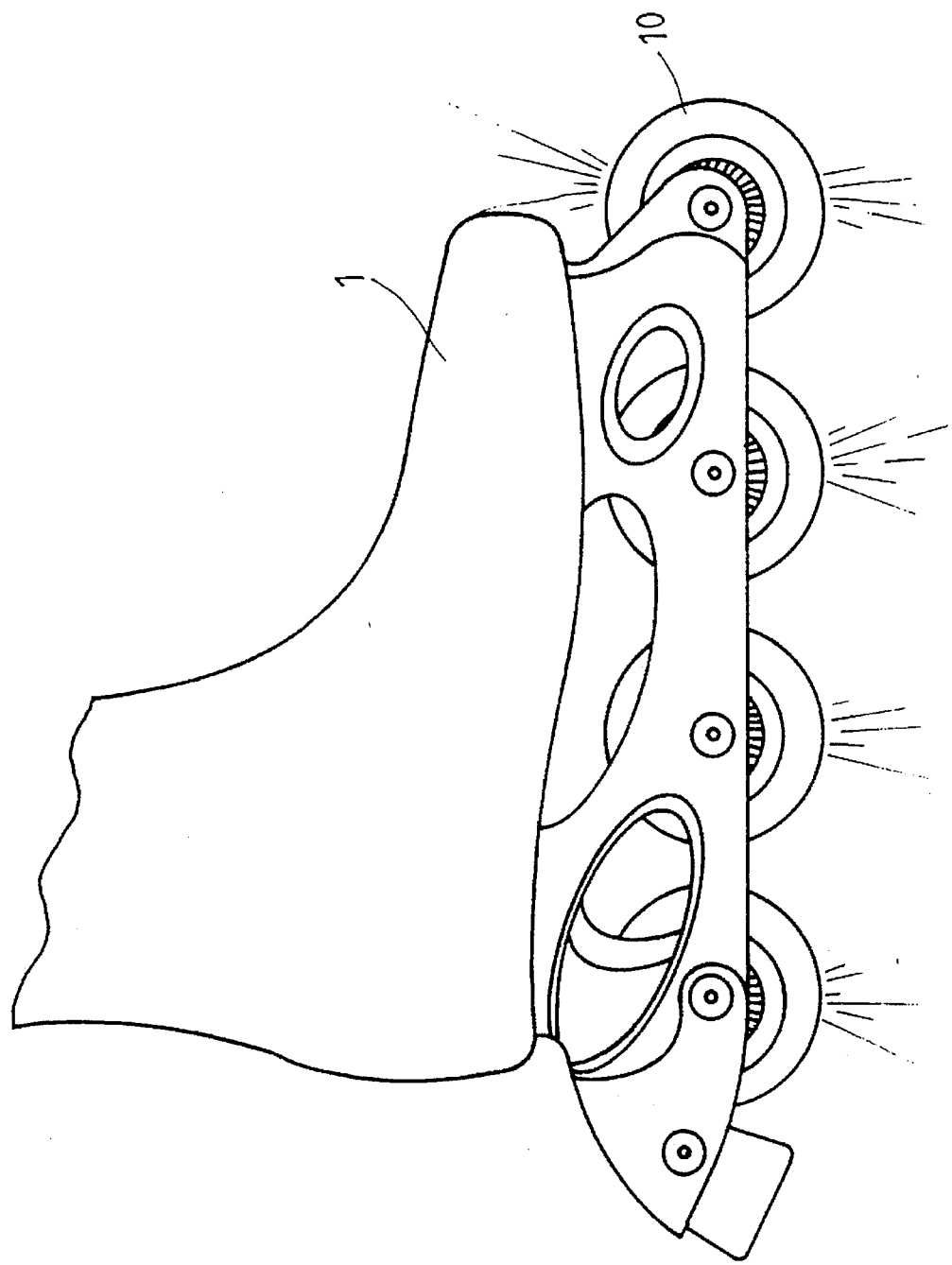
FIG. 4 is a side elevational view of a roller skate with fly wheels.
Figure 5:
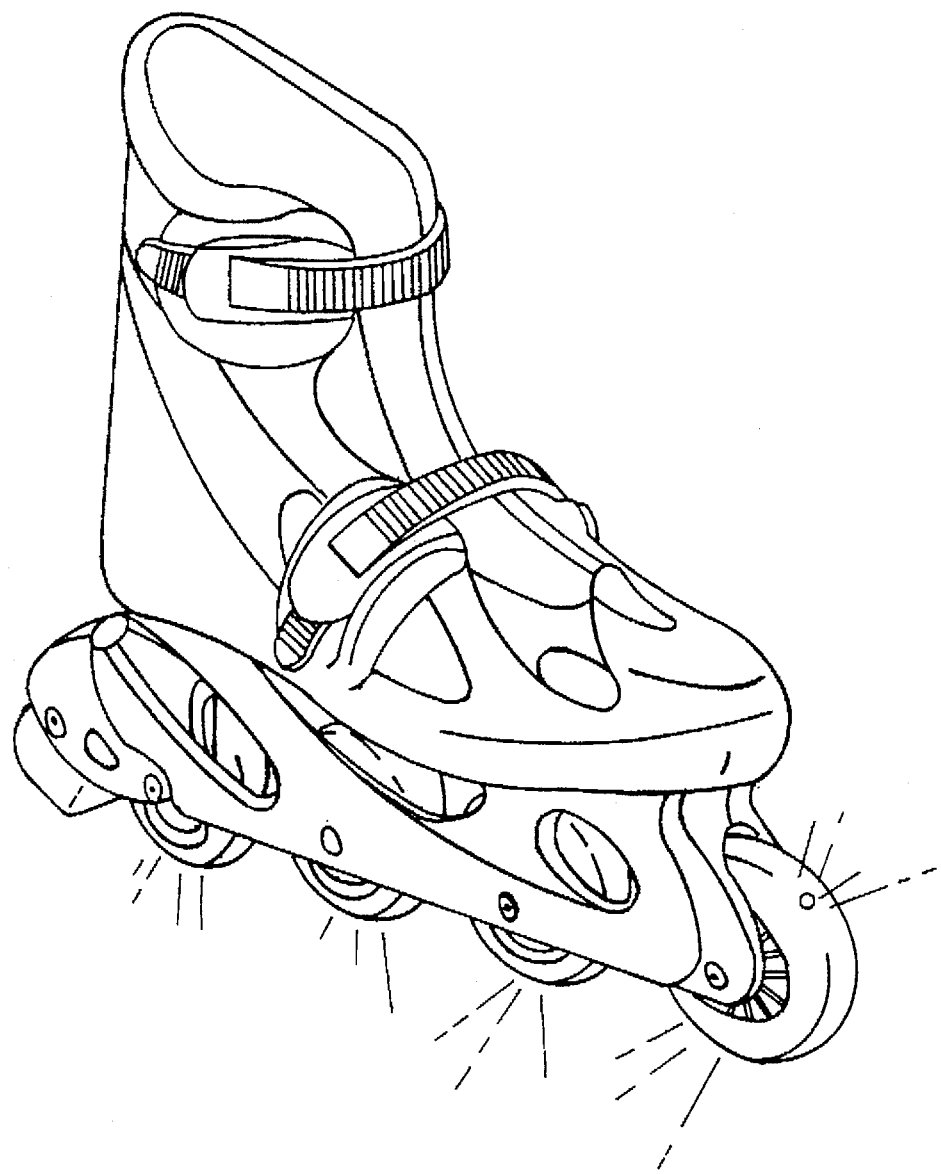
FIG. 5 is a perspective view of a roller skate with fly wheels.

Referring to FIGS. 1 to 5, an automatic power generating flash wheel assembly comprises a fly wheel 10 and at least a coil unit 20. The fly wheel 10 is enclosed by a transparent outer wheel 13. At least an inserted groove 11 is formed in the inner periphery of the fly wheel 10 to receive a set of the coil unit 20. Each of the coil unit 20 has a couple of electrodes 21 at one side and a light-emitting device such as a light-emitting diode (LED) 22 at the opposite side. The electrodes 21 are disposed toward a pivot 40. An annular magnet 30 has a recess 301 formed in the inner periphery of the magnet 30. A protrusion rib 401 on the pivot 40 is inserted through the recess 301. The magnet 30 touches the electrodes 21 slightly. The magnet 30 is disposed between the first and second annular pivot sockets 12. The pivot 40 passes through the first pivot socket 12, the magnet 30 and the second pivot socket 12. The first pivot socket 12, the magnet 30 and the second pivot socket 12 are disposed in the fly wheel 10.

When the outer wheel 13 and the fly wheel 10 are rotated, the corresponding coil units 20 will be rotated simultaneously. Since the rotated electrodes 21 are touched by the magnet 30 slightly, the coil unit 20 will produce electric power while the fly wheel 10 is rotated. The coil unit 20 generates electric power for the LED so that the LED can emit light. The light indicates the position of the roller skate in the dark area.

The comparison of the present invention and the conventional light-emitting roller skate is as follows. The conventional light-emitting roller skate has batteries to provide electric power. Since each battery provides electric power for only one or two light-emitting wheel, the conventional roller skate should be enlarged in order to receive a plurality of batteries and the corresponding electric circuits. However, the present invention need not battery nor the corresponding electric circuits. The power-generating pivot, magnet and coil unit are disposed in the fly wheel so that they do not occupy any extra space. Further, each fly wheel has a power-generating device to generate electric power for the LED.

In addition, one to six fly weels can be disposed under the roller skate.

The invention is not limited to the above embodiment but various modification thereof may be made. It will be understood by those skilled in the art that various changes in form and detail may be made without departing from the spirit and scope of the invention.

I claim:

1. An automatic power generating flash wheel assembly comprising:

at least a fly wheel enclosed by a transparent outer wheel;

at least an inserted groove formed in an inner periphery of said fly wheel to receive a set of coil unit;

each of said coil unit having a couple of electrodes at one side of said coil unit and a light-emitting device at an opposite side of said coil unit;

an annular magnet having a recess formed in an inner periphery of said annular magnet;

a protrusion rib disposed on a pivot being inserted through said recess;

said magnet touching said electrodes slightly;

said magnet disposed between a first and second annular pivot sockets;

said pivot passing through said first pivot socket, said magnet and said second pivot socket; and said first pivot socket, said magnet and said second pivot socket being disposed in said fly wheel.

2. An automatic power generating flash wheel assembly as claimed in claim 1, wherein said light-emitting device is a light-emitting diode.

3. An automatic power generating flash wheel assembly as claimed in claim 1, wherein two of said fly wheels are disposed under a roller skate.

4. An automatic power generating flash wheel assembly as claimed in claim 1, wherein three of said fly wheels are disposed under a roller skate.

5. An automatic power generating flash wheel assembly as claimed in claim 1, wherein four of said fly wheels are disposed under a roller skate.

6. An automatic power generating flash wheel assembly as claimed in claim 1, wherein five of said fly wheels are disposed under a roller skate.

7. An automatic power generating flash wheel assembly as claimed in claim 1, wherein six of said fly wheels are disposed under a roller skate.

* * * * *